(12) United States Patent
Richards et al.

(10) Patent No.: US 9,316,528 B2
(45) Date of Patent: Apr. 19, 2016

(54) WEIGHT-SENSING FORK BLADE ASSEMBLY FOR ENGAGING PALLETS IN DIFFERENT ALTERNATIVE DIRECTIONS OF APPROACH

(71) Applicant: Cascade Corporation, Portland, OR (US)

(72) Inventors: Lawrence E. Richards, Springfield, OH (US); Brian D. Campbell, Camas, WA (US); Brian Sinclair White, Heidelberg (AU)

(73) Assignee: Cascade Corporation, Portland, OR (US)

( * ) Notice: Subject to any disclaimer, the term of this patent is extended or adjusted under 35 U.S.C. 154(b) by 79 days.

(21) Appl. No.: 14/459,181

(22) Filed: Aug. 13, 2014

(65) Prior Publication Data

US 2016/0047688 A1      Feb. 18, 2016

(51) Int. Cl.
*G01G 19/08* (2006.01)
*B66F 17/00* (2006.01)
*B66F 9/12* (2006.01)

(52) U.S. Cl.
CPC ............... *G01G 19/083* (2013.01); *B66F 9/12* (2013.01); *B66F 17/003* (2013.01)

(58) Field of Classification Search
CPC ........ G01G 19/083; B66F 17/003; B66F 9/12
See application file for complete search history.

(56) References Cited

U.S. PATENT DOCUMENTS

| 3,059,710 | A |   | 10/1962 | Pien |  |
|---|---|---|---|---|---|
| 3,063,576 | A | * | 11/1962 | Hofmeister | B66F 9/12 177/139 |
| 4,420,053 | A | * | 12/1983 | Russo | B66C 13/16 177/139 |
| 4,421,186 | A |   | 12/1983 | Bradley |  |
| 4,666,004 | A | * | 5/1987 | Raz | G01G 19/083 177/139 |
| 4,854,406 | A | * | 8/1989 | Appleton | B65F 3/04 177/139 |
| 4,899,840 | A | * | 2/1990 | Boubille | G01G 19/083 177/139 |
| 5,922,998 | A | * | 7/1999 | Zefira | G01G 19/083 177/136 |
| 5,986,560 | A | * | 11/1999 | Rayburn | G01G 19/083 177/136 |
| 6,600,111 | B2 |   | 7/2003 | Simons |  |
| 6,730,861 | B1 | * | 5/2004 | Simons | G01G 19/083 177/136 |
| 6,855,894 | B1 |   | 2/2005 | Van Seumeren |  |
| 7,669,486 | B2 |   | 3/2010 | Simons |  |
| 2007/0041820 | A1 |   | 2/2007 | Simons |  |
| 2008/0178690 | A1 | * | 7/2008 | Simons | G01G 19/083 73/862.541 |
| 2011/0067502 | A1 |   | 3/2011 | Simons |  |

(Continued)

FOREIGN PATENT DOCUMENTS

DE      3802332 A1      8/1989
EP      1200298 B1      1/2009

(Continued)

OTHER PUBLICATIONS

International Search Report and Written Opinion dated May 20, 2015, PCT International App. No. PCT/US2015/016657, Cascade Corporation, 6 pgs.
"i-Forks," Cascade Corporation, Feb. 2011, 5 pgs.

*Primary Examiner* — Randy W Gibson
(74) *Attorney, Agent, or Firm* — Chernoff Vilhauer McClung & Stenzel, LLP

(57) ABSTRACT

An exceptionally thin load-weighing fork assembly, having its weight sensors mounted on a fork base, overcomes fork-insertion limitations with respect to commonly used standard pallets without sacrificing load-handling capacity.

9 Claims, 3 Drawing Sheets

(56) References Cited

U.S. PATENT DOCUMENTS

| | | | |
|---|---|---|---|
| 2013/0015004 A1 | 1/2013 | Simons | |
| 2014/0224588 A1* | 8/2014 | Van Seumeren | B66F 17/003 187/237 |
| 2015/0344277 A1* | 12/2015 | Simons | B66F 9/12 414/21 |
| 2015/0368081 A1* | 12/2015 | van Seumeren | B66F 9/12 187/237 |

FOREIGN PATENT DOCUMENTS

| | | |
|---|---|---|
| WO | 0103990 A1 | 1/2001 |
| WO | 2008134877 A1 | 11/2008 |
| WO | 2010140880 A2 | 12/2010 |
| WO | 2013006038 A1 | 1/2013 |
| WO | 2014003569 A1 | 1/2014 |

* cited by examiner

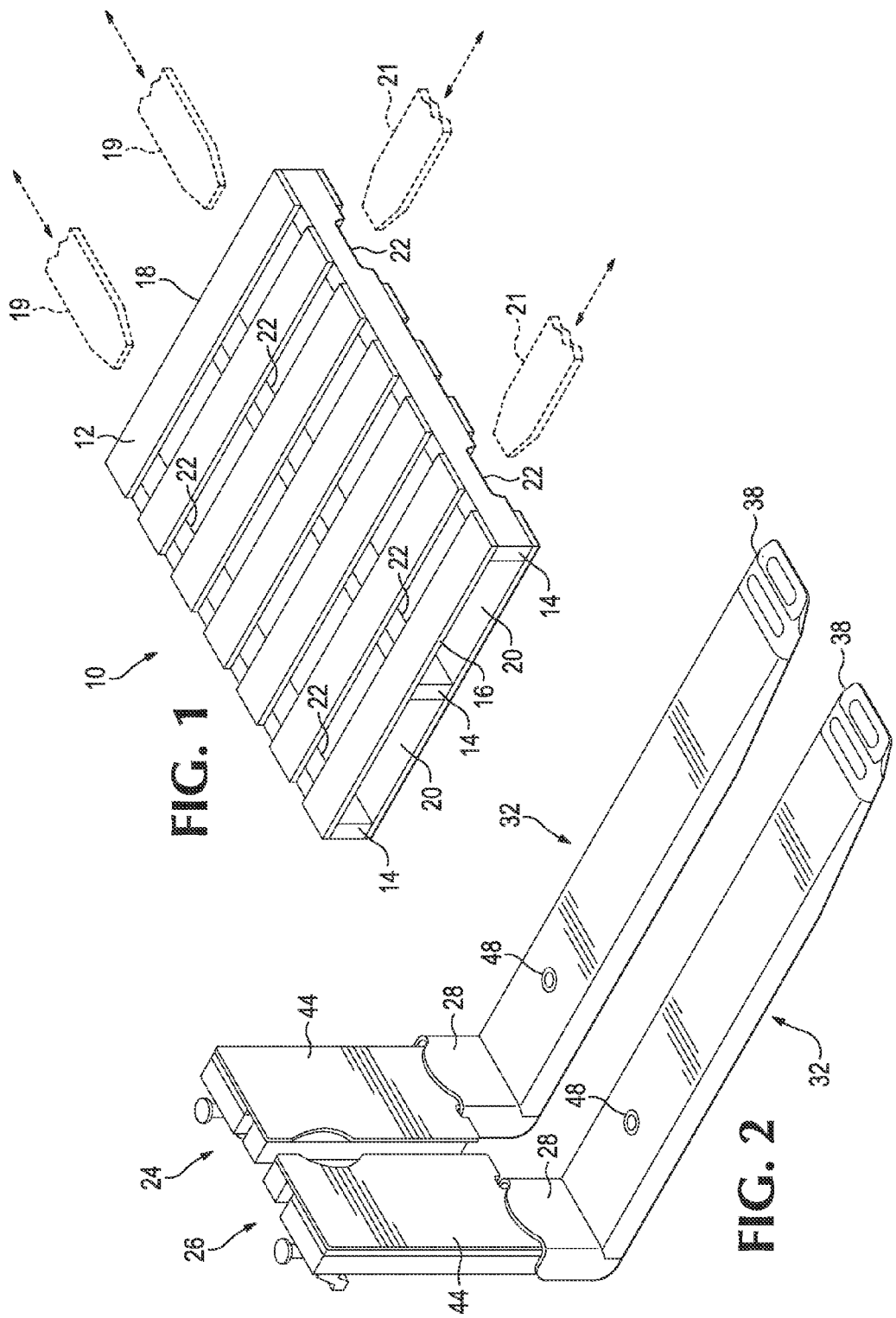

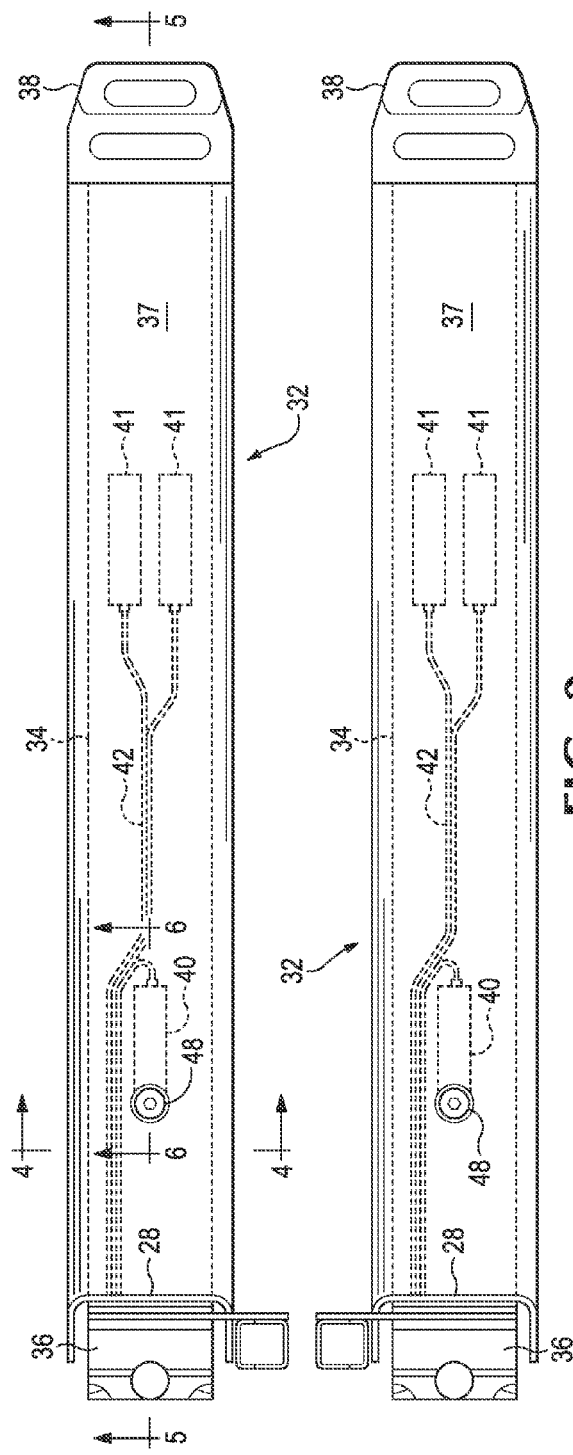
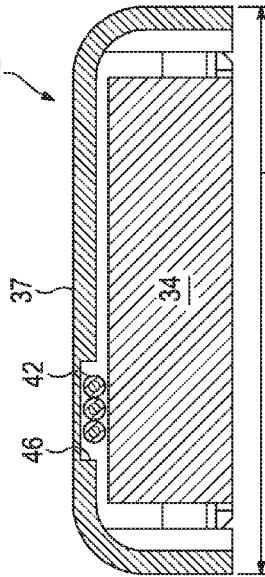

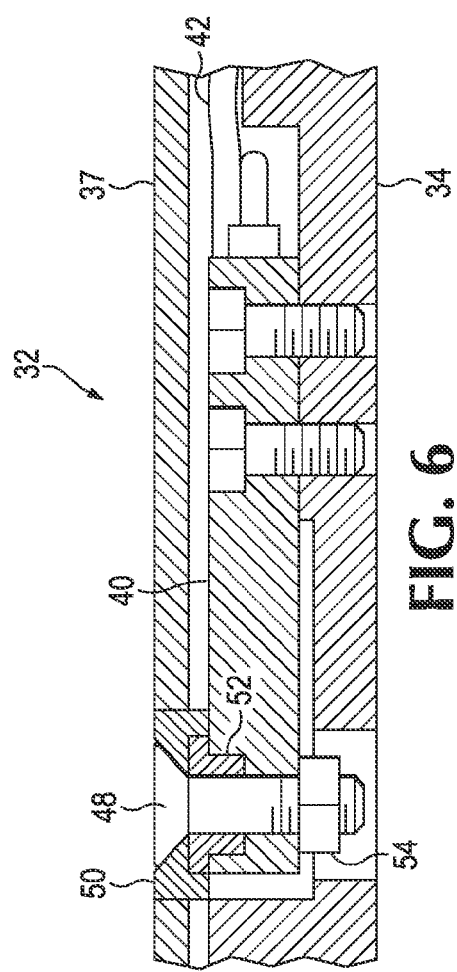
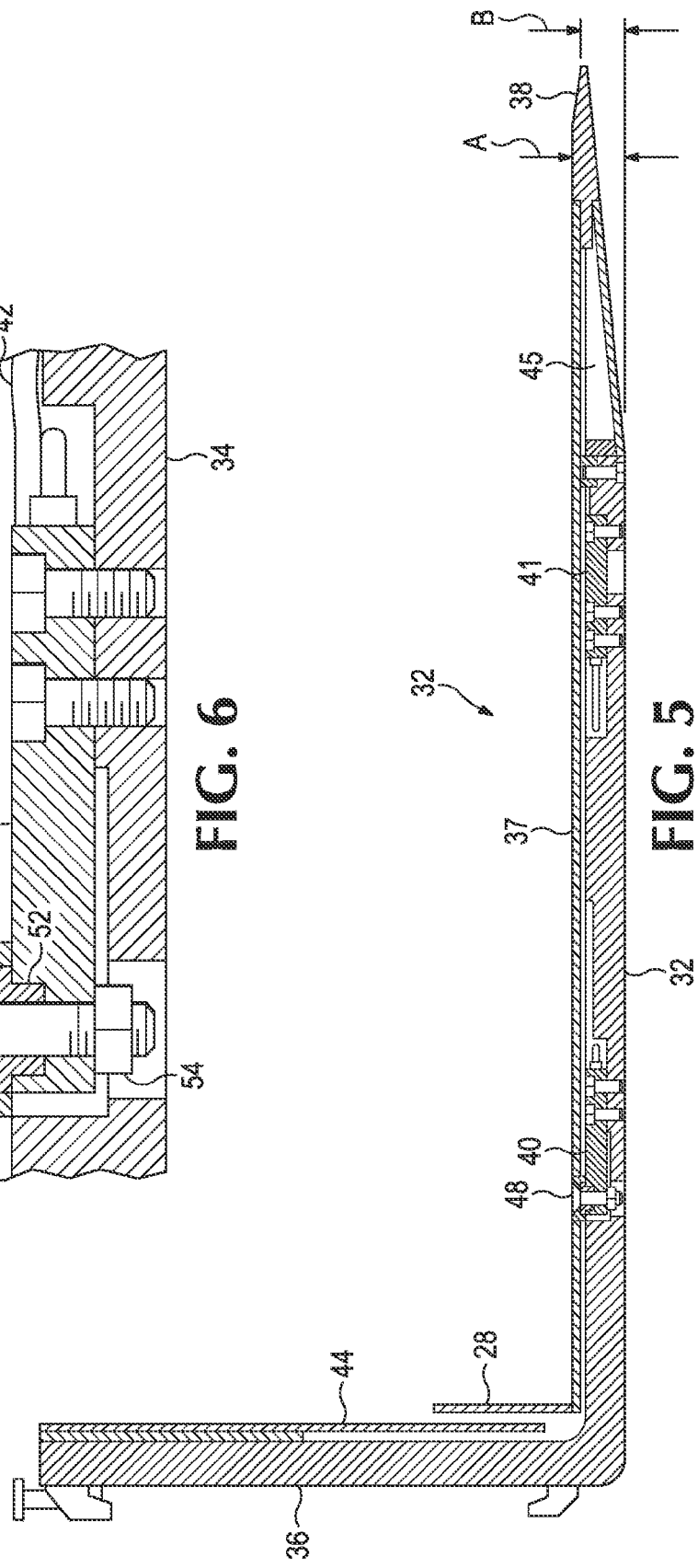

WEIGHT-SENSING FORK BLADE ASSEMBLY FOR ENGAGING PALLETS IN DIFFERENT ALTERNATIVE DIRECTIONS OF APPROACH

CROSS-REFERENCE TO RELATED APPLICATIONS

None.

BACKGROUND OF THE INVENTION

Load-carrying pallets are generally designed to be engaged by load-lifting fork blades insertable horizontally beneath the top of the pallet in multiple alternative selected directions perpendicular to each other. This arrangement advantageously maximizes the alternative directions of approach available to fork-equipped load-lifting equipment when approaching or depositing loads in restricted spaces within load storage facilities, trucks, railcars, cargo ships and the like.

With reference to FIG. 1, the most common type of pallet currently in use for many different types of loads is exemplified by the standard pallet 10 shown in FIG. 1. The pallet 10 has an upper surface 12 supported vertically by parallel spaced beams 14 extending longitudinally below the upper surface between the ends 16 and 18 of the pallet. The beams 14 create parallel, open ended, longitudinal fork-insertion spaces 20 between the beams tall enough to easily accept fork blades exemplified as 19, having either thick vertical profiles for high load-carrying capacity or thinner profiles for lower capacity, along directions of approach parallel to the longitudinal beams 14. However, for transverse directions of approach perpendicular to the beams 14, the transverse fork-insertion spaces usually include narrow slots 22 which are much more restricted in height than the longitudinal fork-insertion spaces 20, so as to insure that the transverse fork-insertion spaces do not excessively weaken the pallet beams 14. Therefore fork blades such as 21, in order to be insertable through the narrow slots 22 of the transverse fork-insertion spaces, cannot have thicknesses as great as those of the fork blades 19, and therefore cannot handle as heavy a range of loads as can the fork blades 19.

Pairs of load-weighing fork assemblies, each having a strong fork base upon which are mounted electrical load-weighing sensors for resiliently supporting the underside of a load-contacting blade member, have been coming into greater usage for the purpose of weighing palletized loads. The load weight is sensed by inserting the load-contacting blade member of each fork assembly into lifting contact with the pallet and lifting the load sufficiently to enable the weight of the load to be supported fully by the load-weighing sensors, as exemplified by U.S. Pat. No. 7,669,486 which is hereby incorporated herein by reference. However in such systems the combination of the fork base, the load-weighing sensors, the electrical conductors and the load-contacting blade member of each fork assembly, when required to support normal palletized loads weighing up to at least about 5000 pounds (2250 kg), render the resultant fork assemblies so thick that they are usually operably insertable only into the above-described taller parallel elongate fork insertion spaces 20 between the beams of the pallet, and not into the above-described transverse insertion spaces 22. This has the serious disadvantage of preventing the availability of alternative perpendicular directions of approach to the load, causing load-maneuvering problems in the many applications where maneuvering space is limited. Such problems in turn tend to discourage the use of weight-sensing fork assemblies, leading some prospective users to adopt less effective alternatives.

Accordingly what is needed is a pair of such load-weighing fork assemblies which are thin enough to avoid the foregoing fork insertion and maneuvering limitations, and yet have the strength, durability and accuracy to reliably handle and weigh the most common types of loads to be encountered.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 is a perspective view of a highly-used existing standard type of pallet, illustrating examples of alternative mutually perpendicular directions of approach or withdrawal of conventional load-handling forks relative to the pallet.

FIG. 2 is a perspective view of a pair of exemplary load-weighing fork assemblies in accordance with the present invention.

FIG. 3 is a top view of the fork assemblies of FIG. 2 with their exemplary hidden weight sensors and related electrical conductors shown in dotted lines.

FIG. 4 is an enlarged cross-sectional view taken along line 4-4 of FIG. 3.

FIG. 5 is a cross-sectional view taken along line 5-5 of FIG. 3.

FIG. 6 is an enlarged sectional view taken along line 6-6 of FIG. 3.

DETAILED DESCRIPTION OF PREFERRED EMBODIMENT

A pair of load-weighing fork assemblies 24 and 26, as shown in FIGS. 2-6, are examples of an exceptionally thin type of load-weighing fork assembly constructed in accordance with the principles of the present invention to overcome the above-described fork-insertion limitations of previous load-weighing fork assemblies. The fork assemblies 24 and 26 are strong enough in combination to operably lift loads of up to about 5000 pounds (2250 kg), with such loads having a center of gravity of up to about 24 inches (about 61 cm) measured forwardly from an upright rear surface 28 of the fork assemblies 24 and 26. Therefore each fork assembly 24, 26 by itself is preferably capable of supporting half of the foregoing load (i.e up to about 2500 pounds or 1125 kg). Taking into account the foregoing 24-inch location of the center of gravity, each fork assembly by itself is also preferably capable of withstanding a downward load moment imposed on the cantilevered fork assembly of up to about 60,000 inch-pounds (about 68,580 cm-kg).

Each load-weighing fork assembly 24, 26 preferably has a respective elongate blade portion, indicated generally as 32, having the following major components:

(1) an elongate fork base 34, preferably principally composed of mild steel (such as ASTM-A-36), extending beneath a major portion of the length of the horizontal blade portion 24, connected at its rear end to a vertical shank portion 36 mountable in any conventional manner to suitable load-lifting equipment (not shown);

(2) an elongate, downwardly-concave, load-contacting blade member 37, which includes the aforementioned upright rear surface 28, preferably principally composed of high-strength low-alloy steel (such as ASTM-A-514)

having a tensile strength higher than that of the fork base 34, preferably extending beyond the forward extremity of the fork base 34 so as to form a tip extremity 38 and an interior space 45 within the blade member 37; and (3) multiple (preferably two or three) electrical load weighing sensors 40 and 41 of a strain-measuring cantilever beam type as shown, or any other commonly known suitable sensor type, for variably deforming in an electrically-measurable fashion in response to variable weights of loads supported by the load contacting blade member 37, with electrical conductors 42 for conducting the variable weight-responsive signals from the sensors 40 to a suitable analyzing circuit of any known appropriate type preferably, but not necessarily, located within a housing such as 44 mounted on the vertical shank portion 36.

In the past the horizontal blade portions of load-weighing fork assemblies, having the foregoing major components and a comparable load-supporting capacity, have required an overall thickness of at least about 2.4 inches (about 6.1 cm), which is much too thick to enable the insertion of such horizontal blade portions into the transverse insertion spaces 22 of the standard type of pallet exemplified in FIG. 1. In contrast, each fork assembly 24, 26 herein has a respective horizontal blade portion 32, as shown in FIGS. 3-6, having a maximum overall thickness A (FIG. 5) of only about 1.8 inches (about 4.5 cm), and a maximum thickness B (FIG. 5) from the bottom of the blade portion to the tip 38 of only about 1.5 inches (about 3.8 cm), which enables the operable insertion of the horizontal blade portion 32 into the transverse insertion spaces 22 of the exemplary pallet 10. In circumstances requiring lesser load-supporting capacities because of lower load weight and/or load moment requirements, each horizontal blade portion can be made even thinner if desired.

A combination of multiple different improvements to previous load-weighing fork assemblies are responsible for the foregoing favorable results. First, the previous normal overall width of 5.2 inches (13.7 cm) for previous load-weighing fork assemblies has been increased herein, as exemplified by dimension C in FIG. 4, to an overall width of at least about 6.4 inches (about 16 cm) to create more transverse interior space for the weight sensors and their electrical conductors and more beam strength for the fork base 34, thereby compensating for the foregoing reduction in overall vertical thickness. Surprisingly, the foregoing increased width does not impede the ease of insertion of the widened horizontal blade portions 32 into the insertion spaces 22 of the exemplary type of pallet 10.

A further improvement enabling the foregoing favorable results is the removal of electrical conductor passageways from the lateral edges of the fork base 34 and the transfer of the conductors 42 to new conductor passageways such as 46 formed in the underside of the load-contacting blade member 37, as exemplified in FIG. 4. In this way the fork base 34 gains beam strength by the removal of conductor passageways from its surfaces, while the load-contacting blade member 37 does not lose any necessary strength as a result of new conductor passageways such as 46, partially due to the principal use of high-strength low-alloy steel in the blade member 37 having a higher tensile strength than the principally mild steel material of the fork base.

Another improvement enabling the foregoing favorable results is the elimination of all but one downwardly-directed fastener 48 extending through the load-contacting blade member 37 into the fork base 34. The single fastener 48 is a strong multi-purpose fastener as exemplified in FIG. 6 which fastens the blade member 37 to the rearward load sensor 40 through a strong collar 50, a bushing 52, and threaded nut 54. Thus the fastener 48 can resist impacts to the tip 38 while also providing some resilience to the impact by being only indirectly connected to the fork base 34 through the sensor 40. The fastener 48 permits the movable rearward end of the load sensor 40 to deflect downwardly in response to the load weight while simultaneously allowing the rearward end of the sensor 40 to retract slightly forwardly in response to its downward deflection, because the blade member 37 is not fastened to the fork base 34 other than indirectly through the fastener 48 and load sensor 40 and therefore is not prevented from moving slightly forwardly in response to the sensor's downward deflection. This increases the sensor's accuracy by eliminating the effects of extraneous longitudinal forces on its strain measurements. For the same reasons, the movable forward ends of the oppositely oriented forward sensors 41 movably engage the blade member 37 horizontally by any convenient means, such as a sliding attachment.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A load-weighing fork assembly including:
    (a) a blade member having an elongate load-supporting surface;
    (b) a fork base, having an elongate bottom surface, operably connected to said blade member with said bottom surface spaced from, and facing generally opposite to, said load-supporting surface;
    (c) multiple load-weighing sensors, operably mounted between said elongate load-supporting surface and said elongate bottom surface, adapted to measure a weight of a load supported by said load-supporting surface; and
    (d) said elongate load-supporting surface and said elongate bottom surface being separated by a distance extending perpendicular to said elongate bottom surface substantially no greater than about 1.8 inches.

2. The load-weighing fork assembly of claim 1 wherein said elongate load-supporting surface has a load-contacting tip at one end thereof, said tip and said elongate bottom surface being separated by a distance extending perpendicular to said elongate bottom surface substantially no greater than about 1.5 inches.

3. The load-weighing fork assembly of claim 1 wherein said load-weighing fork assembly is operable to support a load on said load-supporting surface of at least about 2500 pounds.

4. The load-weighing fork assembly of claim 1 wherein said fork base is supported by said load-weighing fork assembly at only one end of said load-supporting surface, said load-weighing assembly being operable to support a load on said load-supporting surface of at least about 2500 pounds having a center of gravity located 24 inches from said one end of said load-supporting surface.

5. The load-weighing fork assembly of claim 1 wherein said elongate load-supporting surface has a width greater than 5.2 inches.

6. The load-weighing fork assembly of claim 1 wherein said elongate load-supporting surface has a width of at least about 6.4 inches.

7. The load-weighing fork assembly of claim 1 wherein said load-supporting surface has an opposing underside surface with at least one elongate passageway formed therein capable of containing electrical conduits attached to said multiple load-weighing sensors.

8. The load-weighing fork assembly of claim 1 wherein said elongate load-supporting surface has a tip end having a load-contacting tip, and an opposite end, further including a fastener more closely adjacent to said opposite end than to said tip end which interconnects said blade member with said fork base through one of said load-weighing sensors.

9. The load-weighing fork assembly of claim 1 where said elongate load-supporting surface is principally composed of a material having a higher tensile strength than that of the material of which said fork base is principally composed.

\* \* \* \* \*